UNITED STATES PATENT OFFICE.

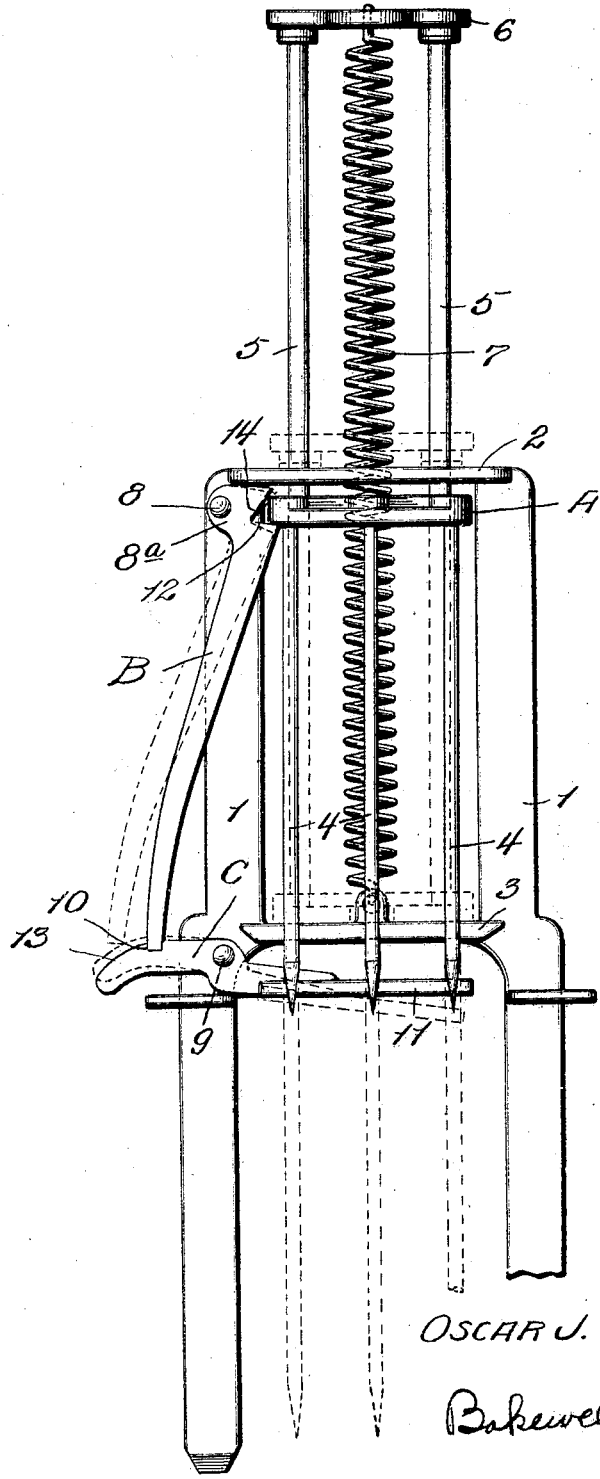

OSCAR J. SCHROETER, OF ST. LOUIS, MISSOURI.

MOLE-TRAP.

1,382,125.      Specification of Letters Patent.      Patented June 21, 1921.

Application filed July 31, 1920. Serial No. 400,457.

*To all whom it may concern:*

Be it known that I, OSCAR J. SCHROETER, a citizen of the United States, residing at St. Louis, Missouri, have invented a certain new and useful Improvement in Mole-Traps, of which the following is a full, clear, and exact description, such as will enable others skilled in the art to which it appertains to make and use the same.

This invention relates to animal traps, and particularly to mole traps of the type in which a spring actuated member provided with prongs or spikes is reciprocatingly mounted on a stationary frame or supporting structure and is held in an elevated position by a latch or trigger mechanism that is adapted to be tripped by a mole traveling through a furrow in the ground at the point where the trap is located.

The main object of my invention is to provide a trap of the kind referred to that can be set by simply moving the pronged member or the equivalent part of the trap upwardly, the trigger mechanism being so constructed that it will automatically engage and lock said pronged member in its raised position. By constructing the trigger mechanism in this manner I simplify the operation of setting the trap, due to the fact that it is not necessary for the user to grasp any element of the trigger mechanism and manually move it into engagement with the pronged member of the trap. I also reduce the liability of the user being injured during the operation of setting the trap, as often occurs with the mole traps of this general design which are now in use.

The figure of the drawings is a front elevational view of a mole trap constructed in accordance with my invention.

Referring to the drawings, 1 designates two vertically-disposed uprights that are combined with a top cross piece 2 and an intermediate cross piece 3, so as to form a supporting frame for a vertically-reciprocating member A which is provided with prongs or spikes 4. The member A is provided with guide rods 5 that project upwardly through the top cross piece 2 of the supporting frame and whose upper ends are connected to a cap piece 6 that is secured to the upper end of a contractile spring 7 whose lower end is fastened to the intermediate cross piece 3 of the supporting frame.

In using the trap the lower end portions of the uprights 1 of the supporting frame are forced into the ground at such a point that they will straddle or be arranged on opposite sides of a mole furrow, and the pronged member A is then moved upwardly so as to stretch the spring 7 or place it under tension, said member A being held in its elevated position by a trigger mechanism which is so constructed that it will automatically engage and lock the member A when said member reaches a point in proximity to the top cross piece 2 of the supporting frame.

The trigger mechanism just referred to consists of a locking member B pivotally connected at 8 to one of the uprights 1 of the supporting frame, and a latch C pivotally connected at 9 to said upright and provided at one end with a notch 10 that is adapted to receive the lower end of the locking member B and at its opposite end with a portion 11 which is adapted to be engaged and moved upwardly by a mole traveling through the furrow straddled by the supporting frame of the trap. The locking member B consists of a lever provided at its upper end with a laterally-projecting portion or offset portion 8ª through which the pivot 8 passes, and said lever is provided at a point slightly to one side of said pivot with a shoulder 12 that is adapted to serve as a stop or abutment against which the underside of the pronged member bears when said member is in its operative or elevated position, as shown in full lines in the drawing.

When the trap is inoperative or is sprung the parts of same occupy the position shown in broken lines in the drawing, the pronged member A being in proximity to the intermediate cross piece 3 of the supporting frame, and the lower end of the locking lever B resting upon a curved surface or cam face 13 on the latch C. To set the trap it is only necessary to pull the member A upwardly, the upward movement of said member causing the locking lever B to swing into such a position that the lower end of said lever enters the notch 10 in the latch C, whereupon said lever will be locked in the position shown in full lines in the drawing, thus causing the member A to be locked in its elevated position. The upper end portion of the locking lever B is so arranged that it will be engaged by the pronged member A during the upward movement of said member A in such a way that the portion of said lever B on which the shoulder 12 is formed first swings out of the path of movement of the member A and then swings back into such a position that said shoulder 12 is arranged underneath the underside of the member A. If desired, the locking lever B can be provided with an inclined surface 14 arranged in such a manner that it will be engaged by the member A during the last portion of the upward movement of said member, thus causing the locking lever B to be moved positively into such a position that the shoulder 12 thereon is positioned under the member A. The latch C is counterweighted or is so balanced that the right hand end portion 11 of same is heavier than the portion of said latch in which the notch 10 is formed, it being preferable to construct the latch in this manner so as to insure said latch moving upwardly into engagement with the lower end of the locking lever B when said lever B swings inwardly, due to the upward movement of the pronged member A. When the trap is set, as shown in full lines in the drawing, an upward movement of the portion 11 of the latch C, caused by a mole traveling through a furrow adjacent to which the trap is arranged, will cause the notched end of said latch to swing downwardly, thereby releasing the locking lever B. As soon as said lever is released from the latch C the spring 7 forces the pronged member A downwardly. To set the trap it is only necessary to move the pronged member A upwardly, said member becoming locked automatically by the lever B and latch C without the necessity of the user manipulating any part of the trigger mechanism.

Having thus described my invention, what I claim as new and desire to secure by Letters Patent, is:

A trap, comprising a vertically-disposed supporting frame that is adapted to be arranged in the ground, a spring-actuated, pronged member reciprocatingly mounted in said frame, a lever provided at its upper end with an offset portion that is pivotally connected to said frame, said lever having a shoulder that is adapted to move into the path of said pronged member, a latch pivotally connected to said frame in proximity to the ground and provided at one end with a cam surface on which the lower end of said lever bears when the trap is inoperative, a notch in said latch in proximity to said cam surface for receiving the lower end of said lever when the trap is set, and means at the opposite end of said latch that is adapted to be moved upwardly so as to release the lower end of said lever.

OSCAR J. SCHROETER.